(12) United States Patent
Guzik et al.

(10) Patent No.: US 12,444,190 B2
(45) Date of Patent: Oct. 14, 2025

(54) ARTIFICIAL INTELLIGENCE (AI) TRAINED DATA MODEL SELECTION

(71) Applicants: Getac Technology Corporation, Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 1130 days.

(21) Appl. No.: 17/107,866

(22) Filed: Nov. 30, 2020

(65) Prior Publication Data

US 2022/0171971 A1 Jun. 2, 2022

(51) Int. Cl.
| | |
|---|---|
| G06V 20/40 | (2022.01) |
| G06F 16/435 | (2019.01) |
| G06F 18/214 | (2023.01) |
| G06N 20/00 | (2019.01) |
| G06V 20/52 | (2022.01) |

(52) U.S. Cl.
CPC ............ *G06V 20/41* (2022.01); *G06F 16/435* (2019.01); *G06F 18/214* (2023.01); *G06N 20/00* (2019.01); *G06V 20/52* (2022.01)

(58) Field of Classification Search
CPC ...... G06V 20/41; G06V 20/52; G06F 16/435; G06F 18/214; G06N 20/00
See application file for complete search history.

(56) References Cited

U.S. PATENT DOCUMENTS

| | | |
|---|---|---|
| 6,760,744 B1 | 7/2004 | Halaas et al. |
| 7,917,888 B2 | 3/2011 | Chong et al. |
| 8,452,722 B2 | 5/2013 | Naeve et al. |
| 8,606,844 B2 | 12/2013 | Kaufman et al. |

(Continued)

FOREIGN PATENT DOCUMENTS

| | | |
|---|---|---|
| CN | 109671266 B | 11/2020 |
| JP | 2008204219 A | 9/2008 |

(Continued)

OTHER PUBLICATIONS

U.S. Appl. No. 17/107,708, Final Office Action mailed Aug. 19, 2022, 52 pages.

(Continued)

*Primary Examiner* — Reji Kartholy
(74) *Attorney, Agent, or Firm* — Finnegan, Henderson Farabow, Garrett & Dunner, L.L.P.

(57) ABSTRACT

This disclosure describes techniques for continuous improvement of machine learning models (also called data models) in a Content Management System (CMS). In one example, a CMS may store a set of data models for each application such as plate number recognition, facial recognition, a determination of likelihood of assault to a law enforcement officer in a traffic violation or robbery scenario, and car identification. In an example embodiment, a predictive model may be used to select a data model from the plurality of data models. The selected data model may be further improved or trained to a new sample of data features to generate an output pattern (e.g., likelihood of assault to a law enforcement officer).

17 Claims, 5 Drawing Sheets

(56) References Cited

U.S. PATENT DOCUMENTS

| | | | |
|---|---|---|---|
| 8,688,320 B2 | 4/2014 | Faenger | |
| 9,110,774 B1 | 8/2015 | Bonn et al. | |
| 9,264,678 B2 | 2/2016 | Nuyttens et al. | |
| 9,449,229 B1 | 9/2016 | Laska et al. | |
| 9,483,732 B1 | 11/2016 | Milakovich | |
| 9,485,474 B2 | 11/2016 | Kim et al. | |
| 9,681,104 B2 | 6/2017 | Billau et al. | |
| 9,723,251 B2 | 8/2017 | Slotky | |
| 9,738,125 B1 | 8/2017 | Brickley et al. | |
| 9,755,890 B2 | 9/2017 | Robertson et al. | |
| 9,832,205 B2 | 11/2017 | Santhi et al. | |
| 9,848,312 B2 | 12/2017 | Sundel et al. | |
| 9,852,132 B2 | 12/2017 | Chhichhia et al. | |
| 9,886,261 B1 | 2/2018 | Hotchkies | |
| 10,324,773 B2 | 6/2019 | Wing et al. | |
| 10,460,014 B2 | 10/2019 | Lloyd et al. | |
| 10,540,883 B1 | 1/2020 | Keil et al. | |
| 10,902,955 B1 | 1/2021 | Federoff et al. | |
| 11,238,290 B2 | 2/2022 | Burns et al. | |
| 11,605,288 B2 | 3/2023 | Guzik | |
| 2003/0081127 A1 | 5/2003 | Kirmuss | |
| 2003/0095688 A1 | 5/2003 | Kirmuss | |
| 2003/0163512 A1 | 8/2003 | Mikamo | |
| 2003/0208679 A1 | 11/2003 | Vazquez | |
| 2006/0257001 A1 | 11/2006 | Veen et al. | |
| 2006/0271914 A1* | 11/2006 | Gopal | G06F 8/658 717/122 |
| 2008/0147267 A1 | 6/2008 | Plante et al. | |
| 2008/0303903 A1 | 12/2008 | Bentley et al. | |
| 2009/0150017 A1 | 6/2009 | Caminiti et al. | |
| 2009/0210455 A1 | 8/2009 | Sarkar et al. | |
| 2009/0248711 A1 | 10/2009 | Martinez et al. | |
| 2009/0284359 A1 | 11/2009 | Huang et al. | |
| 2010/0036560 A1 | 2/2010 | Wright et al. | |
| 2010/0144318 A1 | 6/2010 | Cable | |
| 2011/0205068 A1 | 8/2011 | Huynh et al. | |
| 2011/0302151 A1 | 12/2011 | Abadi et al. | |
| 2012/0084747 A1 | 4/2012 | Chakradhar et al. | |
| 2013/0039542 A1 | 2/2013 | Guzik | |
| 2013/0344856 A1 | 12/2013 | Silver et al. | |
| 2013/0347005 A1 | 12/2013 | Lam et al. | |
| 2014/0343796 A1 | 11/2014 | Abuelsaad et al. | |
| 2015/0089019 A1 | 3/2015 | Chou | |
| 2015/0341370 A1 | 11/2015 | Khan | |
| 2016/0042767 A1 | 2/2016 | Araya et al. | |
| 2016/0086397 A1 | 3/2016 | Phillips | |
| 2016/0153801 A1 | 6/2016 | Cho et al. | |
| 2016/0190859 A1 | 6/2016 | Blum et al. | |
| 2016/0248856 A1 | 8/2016 | Kao | |
| 2016/0300156 A1* | 10/2016 | Bowers | G06F 16/2465 |
| 2016/0342447 A1 | 11/2016 | Richter et al. | |
| 2016/0371553 A1 | 12/2016 | Farnham, IV et al. | |
| 2016/0378607 A1 | 12/2016 | Kumar et al. | |
| 2017/0011324 A1 | 1/2017 | Truong et al. | |
| 2017/0048482 A1 | 2/2017 | Drako et al. | |
| 2017/0091651 A1* | 3/2017 | Miao | G06F 8/65 |
| 2017/0148027 A1 | 5/2017 | Yu et al. | |
| 2017/0161323 A1 | 6/2017 | Simitsis et al. | |
| 2017/0161409 A1 | 6/2017 | Martin | |
| 2017/0164062 A1 | 6/2017 | Abramov et al. | |
| 2017/0339021 A1 | 11/2017 | Dukatz | |
| 2018/0079413 A1 | 3/2018 | Herrero et al. | |
| 2018/0145923 A1 | 5/2018 | Chen et al. | |
| 2018/0285759 A1* | 10/2018 | Wood | G06N 3/006 |
| 2018/0365909 A1 | 12/2018 | Cheng et al. | |
| 2019/0019122 A1 | 1/2019 | Allen | |
| 2019/0026665 A1 | 1/2019 | Caskey et al. | |
| 2019/0043351 A1 | 2/2019 | Yang et al. | |
| 2019/0054925 A1 | 2/2019 | Froeschl et al. | |
| 2019/0095805 A1 | 3/2019 | Tristan et al. | |
| 2019/0140886 A1 | 5/2019 | Zywicki et al. | |
| 2019/0325354 A1 | 10/2019 | Rajnayak et al. | |
| 2020/0007827 A1 | 1/2020 | Saad et al. | |
| 2020/0072637 A1 | 3/2020 | Guidotti et al. | |
| 2020/0074156 A1 | 3/2020 | Janumpally et al. | |
| 2020/0081899 A1 | 3/2020 | Shapur et al. | |
| 2020/0145620 A1 | 5/2020 | Alcantara et al. | |
| 2020/0151360 A1 | 5/2020 | Zavesky et al. | |
| 2020/0172112 A1 | 6/2020 | Kawashima | |
| 2020/0211216 A1 | 7/2020 | Hagio et al. | |
| 2020/0242483 A1* | 7/2020 | Shashikant Rao | G06F 16/285 |
| 2020/0304854 A1 | 9/2020 | Baumgartner et al. | |
| 2020/0312046 A1 | 10/2020 | Righi et al. | |
| 2020/0351381 A1 | 11/2020 | Lacey et al. | |
| 2020/0387833 A1 | 12/2020 | Kursun | |
| 2021/0012187 A1* | 1/2021 | Turgeman | G06N 3/08 |
| 2021/0076002 A1 | 3/2021 | Peters et al. | |
| 2021/0089374 A1 | 3/2021 | Watson et al. | |
| 2021/0117859 A1* | 4/2021 | Rogers | G06N 3/045 |
| 2021/0133808 A1 | 5/2021 | Chan et al. | |
| 2021/0136277 A1 | 5/2021 | McFarlane | |
| 2021/0191963 A1* | 6/2021 | Walton | G06F 16/34 |
| 2021/0272702 A1 | 9/2021 | Hakami | |
| 2021/0297929 A1 | 9/2021 | Frusina et al. | |
| 2021/0377205 A1 | 12/2021 | Brown et al. | |
| 2022/0014907 A1 | 1/2022 | Boyd et al. | |
| 2022/0169258 A1 | 6/2022 | Samarthyam et al. | |
| 2022/0172604 A1 | 6/2022 | Guzik | |
| 2022/0291752 A1 | 9/2022 | Agu | |
| 2023/0206749 A1 | 6/2023 | Guzik | |

FOREIGN PATENT DOCUMENTS

| | | |
|---|---|---|
| KR | 20130010400 A | 1/2013 |
| KR | 20190086134 A | 7/2019 |
| WO | 2010056891 A1 | 5/2010 |

OTHER PUBLICATIONS

U.S. Appl. No. 17/107,714, Office Action mailed Aug. 18, 2022, 66 pages.

U.S. Appl. No. 17/107,785, Notice of Allowance mailed Nov. 10, 2022, 26 pages.

U.S. Appl. No. 17/107,830, Notice of Allowance Nov. 9, 2022, 22 pages.

U.S. Appl. No. 17/107,877, Notice of Allowance mailed Aug. 22, 2022, 40 pages.

U.S. Appl. No. 17/590,738, Notice of Allowance mailed Oct. 5, 2022, 48 pages.

International Patent Application No. PCT/US2021/060890, International Search Report and Written Opinion mailed Mar. 21, 2022, 11 pages.

International Patent Application No. PCT/US2021/060892, International Search Report and Written Opinion mailed Mar. 21, 2022, 10 pages.

International Patent Application No. PCT/US2021/060893, International Search Report and Written Opinion mailed Mar. 21, 2022, 9 pages.

International Patent Application No. PCT/US2021/060894, International Search Report and Written Opinion mailed Mar. 21, 2022, 9 pages.

International Patent Application No. PCT/US2021/060895, International Search Report and Written Opinion mailed Mar. 21, 9 pages.

International Patent Application No. PCT/US2021/060896, International Search Report and Written Opinion mailed Mar. 14, 2022, 11 pages.

Juan Rendon et al. Structural combination of neural network models. 2016 IEEE 16th International Conference on Data Mining Workshops (ICDMW). IEEE. Dec. 12, 2016, pp. 406-413. Section II; and figure 2.

Massimo Bonavita et al. Machine Learning for Model Error Inference and Correction. Journal of Advances in Modeling Earth Systems. Nov. 13, 2020, pp. 1-22. Section 2.1; and figure 1.

MD Manjurul Ahsan et al. Deep MLP-CNN Model Using Mixed-Data to Distinguish between COVID-19 and Non-COVID-19 Patients. Symmetry 2020. Sep. 16, 2020, pp. 1-14. Section 2; and figure 3.

U.S. Appl. No. 17/107,708, Office Action mailed May 9, 2022, 57 pages.

(56) References Cited

OTHER PUBLICATIONS

U.S. Appl. No. 17/107,764, Office Action mailed Dec. 8, 2021, 38 pages.
U.S. Appl. No. 17/107,785, Final Office Action mailed May 11, 2022, 9 pages.
U.S. Appl. No. 17/107,785, Office Action mailed Mar. 29, 2022, 30 pages.
U.S. Appl. No. 17/107,824, Notice of Allowance mailed May 2, 2022, 34 pages.
U.S. Appl. No. 17/107,824, Office Action mailed Dec. 29, 2021, 30 pages.
U.S. Appl. No. 17/107,877, Final Office Action mailed Dec. 29, 2021, 40 pages.
U.S. Appl. No. 17/107,891, Notice of Allowance mailed Nov. 2, 2021, 23 pages.
Van Hiep Phung et al. A High-Accuracy Model Average Ensemble of Convolutional Neural Networks for Classification of Cloud Image Patches on Small Datasets. Applied Sciences 2019. Oct. 23, 2019, pp. 1-16. Section 2; and figure 3.
Xueheng Qiu et al. Ensemble Deep Learning for Regression and Time Series Forecasting. 2014 IEEE Symposium on Computational Intelligence in Ensemble Learning (CIEL). IEEE, Dec. 9, 2014, pp. 1-6.
U.S. Appl. No. 17/107,764, Notice of Allowance mailed May 26, 2022, 26 pages.
U.S. Appl. No. 17/107,785, Office Action mailed Jul. 7, 2022, 21 pages.
U.S. Appl. No. 17/107,824, Notice of Allowance mailed Jun. 7, 2022, 33 pages.
U.S. Appl. No. 17/107,830, Office Action mailed Jun. 7, 2022, 51 pages.
U.S. Appl. No. 17/107,891, Office Action mailed Apr. 1, 2021, 22 pages.
Li et al. "Exploration of classification confidence in ensemble learning" Sep. 2014 https://www.sciencedirect.com/science/article/pii/S0031320314001198 (Year: 2014).
Mousavi et al. "A new ensemble learning methodology based on hybridization of classifier ensemble selection approaches" Dec. 2015 https://www.sciencedirect.com/science/article/pii/S1568494615005797 (Year: 2015).
U.S. Appl. No. 17/107,865, Office Action mailed Aug. 4, 2023, 91 pages.
U.S. Appl. No. 18/117,936, Notice of Allowance mailed Sep. 20, 2023, 21 pages.
U.S. Appl. No. 18/117,936, Office Action mailed Jul. 19, 2023, 30 pages.
U.S. Appl. No. 17/107,708, Notice of Allowance mailed Mar. 29, 2023, 26 pages.
U.S. Appl. No. 17/107,708, Office Action mailed Dec. 8, 2022, 44 pages.
U.S. Appl. No. 17/107,714, Notice of Allowance mailed Dec. 15, 2022, 31 pages.
Wang et al., Supporting Very Large Models using Automatic Dataflow Graph Partitioning, 2019 (Year: 2019).
U.S. Appl. No. 17/107,877, Office Action mailed Aug. 18, 2021, 40 pages.
U.S. Appl. No. 17/107,891, Final Office Action mailed Aug. 5, 2021, 21 pages.
U.S. Appl. No. 18/117,698, Office Action mailed Oct. 3, 2023, 32 pages.

* cited by examiner

```
┌─────────────────────────┐         ┌─────────────────────────┐
│ FIRST PATROL UNIT 310   │         │ SECOND PATROL UNIT 320  │
└─────────────────────────┘         └─────────────────────────┘
              ╲                     ╱
               ╲    ┌─────────┐    ╱
                ╲   │NETWORK(S)│   ╱
                    │   330   │
                    └─────────┘
                         │
```

NOC SERVER 302

COMMUNICATION INTERFACE 304

PROCESSOR(S) 306

MEMORY 350

MEMORY CONTROLLER 352

CONTENT MANAGEMENT SYSTEM (CMS) 360

DATA PRE-PROCESSING MODULE 362

DATA MODEL RECOMMENDER 364

PREDICTION MODEL 366

DATABASE 368

DATA MODEL REPOSITORY 370

RUN MANAGER 372

APP ADMINISTRATOR 374

APPLICATIONS 376

REPOSITORY OF RUN RESULTS 378

THRESHOLDS 380

ARTIFICIAL INTELLIGENCE (AI) TRAINED DATA MODEL SELECTION

BACKGROUND

Law enforcement agencies provide officers and agents with an assortment of devices—electronic and otherwise—to carry out duties required of a law enforcement officer. Such devices include radios (in-vehicle and portable), body-worn cameras, weapons (guns, Tasers, clubs, etc.), portable computers, and the like. In addition, vehicles such as cars, motorcycles, bicycles, and SEGWAY are typically equipped with electronic devices associated with the vehicle, such as vehicle cameras, sirens, beacon lights, spotlights, personal computers, etc.

It is increasingly common for law enforcement agencies to require officers to activate cameras (body-worn and vehicle-mounted) that enable officers to capture audio and/or video of incidents in which an officer is involved. This provides a way to collect and preserve evidence, that would otherwise be unavailable, for subsequent legal proceedings. This evidence greatly aids in the investigation of criminal activities, identification of perpetrators of crimes, and examination of allegations of police misconduct, to name a few advantages.

It is also desirable in many circumstances that the captured audio and/or video contents are processed substantively in real-time through machine learning analysis to provide information or advance warning to the officers. For instance, in a situation where an officer is patrolling a violent neighborhood, it may be desirable to collect and process data such as a sound of gunfire to aid officers on likely location of the shooter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for continuous improvement of data models (also called machine learning models) in a Content Management System (CMS). A data model may include a summary of a data set. The data set may include independent data features (e.g., gender, age, number of previous traffic citations, number of convictions, gun owner) and/or dependent features that can generally include a desired end prediction (e.g., likelihood that an officer gets assaulted, verification of license place). In one example, a CMS may store a set of data models for each application (or desired end prediction) such as plate number verification, facial recognition, a determination of likelihood of assault to a law enforcement officer in a traffic violation or robbery scenario, and a car identification. Each data model in the set of data models for each application may utilize a particular algorithm (e.g., decision trees, linear regression, logistic regression, support vector machines), a particular number of data features as variables, or a combination thereof. For each data model in the set of data models, the CMS may store data model identifications (IDs), historical versions including date/time stamps of each data model that can be improved multiple times over time, data set IDs, data sets, expected (or calculated) accuracies of the data models, and detected actual accuracies. The CMS may further track the expected and actual accuracies of each data model in the set of data models and in example embodiments facilitate the performing of improvements on the data models. The improvements may be performed when an expected accuracy of a particular data model can become unreliable due to an inefficient data model prediction algorithm or incorrect data set because of defective devices that captured telemetry data. In this manner and over time, the CMS may not only store the improved data models for the set of data models but also store the historical versions of the improved data models, the associated features, and underlying data sets of the improved data models.

In an embodiment, where a software developer is trying to select an appropriate data model for a particular application that the software developer is planning to build, a prediction model may be utilized to select a data model from the set of data models. Each data model in this set of data models may generate a type of end prediction that is similar to a desired end prediction of the application to be built. Further, each data model in the set of data models may include a corresponding confidence level. Accordingly, the prediction model may be used to select the data model in the set of data models that includes a high confidence level. Upon selection of the data model, the software developer may then use the selected data model as a starting point for the particular application, and the software developer can further perform improvements on the selected data model to generate a new data model. For example, the software developer may retrieve and integrate an underlying data set of the selected data model with an underlying data set of another version of the selected data model to create an incorporated data set that can be used to create the new data model. In this example, the new data model may include improved predictive capabilities and be stored as another version of the selected data model. In this case, the use of the prediction model on the CMS stored set of data models may facilitate a speedier selection of the data model that can be further manipulated and improved. Alternatively, or additionally, the prediction model may be utilized to select the data model that can be trained to a new sample of data features to generate an end prediction such as a likelihood of physical threat against a law enforcement officer.

In one example, a set of data models may generate output patterns that are similar to an output pattern (end prediction) of a particular application to be built. In this case, the prediction model may be created from a training data that includes an arbitrary number of data models in the set of data models. Further, the arbitrary number of data models in the training data may include one or more versions of these data models in the training data. Upon the creation of the prediction model, the prediction model may be trained on new sample of data models (test data) to select the data model that can be associated with a substantively high confidence level. In some cases, the prediction model selects the data model on the new sample of data models based upon criteria (e.g., type and number of data features) for the application to be built. The selected data model may then be used to determine the desired end prediction of the particular application to be built.

Note that in an actual law enforcement implementation context, the data model will generate an end prediction that may have great consequences for law enforcement officers. The data model may predict the likelihood that the law enforcement officer will be assaulted, or shot. Many times, officers that assume they might have to anticipate being shot, are wrong, and then use deadly force to tragic effect. Other officers underestimate risk and then are injured or killed. But data models cannot predict with 100% accuracy that an event will occur. Accordingly, the manner of building up of the data models in the CMS as described herein may be leveraged to overcome the deficiency of the data model to predict with 100% accuracy. The CMS may be configured to constantly track the data models and constantly perform updates to substantively improve the data models that are critical in law enforcement applications. The substantively improved data models may overcome the deficiency of the data models to predict with 100% accuracy.

As used herein, the terms "device," "portable device," "electronic device," and "portable electronic device" are used to indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

The implementation and operations described above are ascribed to the use of the server; however, alternative implementations may execute certain operations in conjunction with or wholly within a different element or component of the system(s). Further, the techniques described herein may be implemented in a number of contexts, and several example implementations and context are provided with reference to the following figures. The term "techniques," as used herein, may refer to system(s), method(s), computer-readable instruction(s), module(s)m algorithms, hardware logic, and/or operation(s) as permitted by the context described above and throughout the document.

Example Architecture

Figure 1:
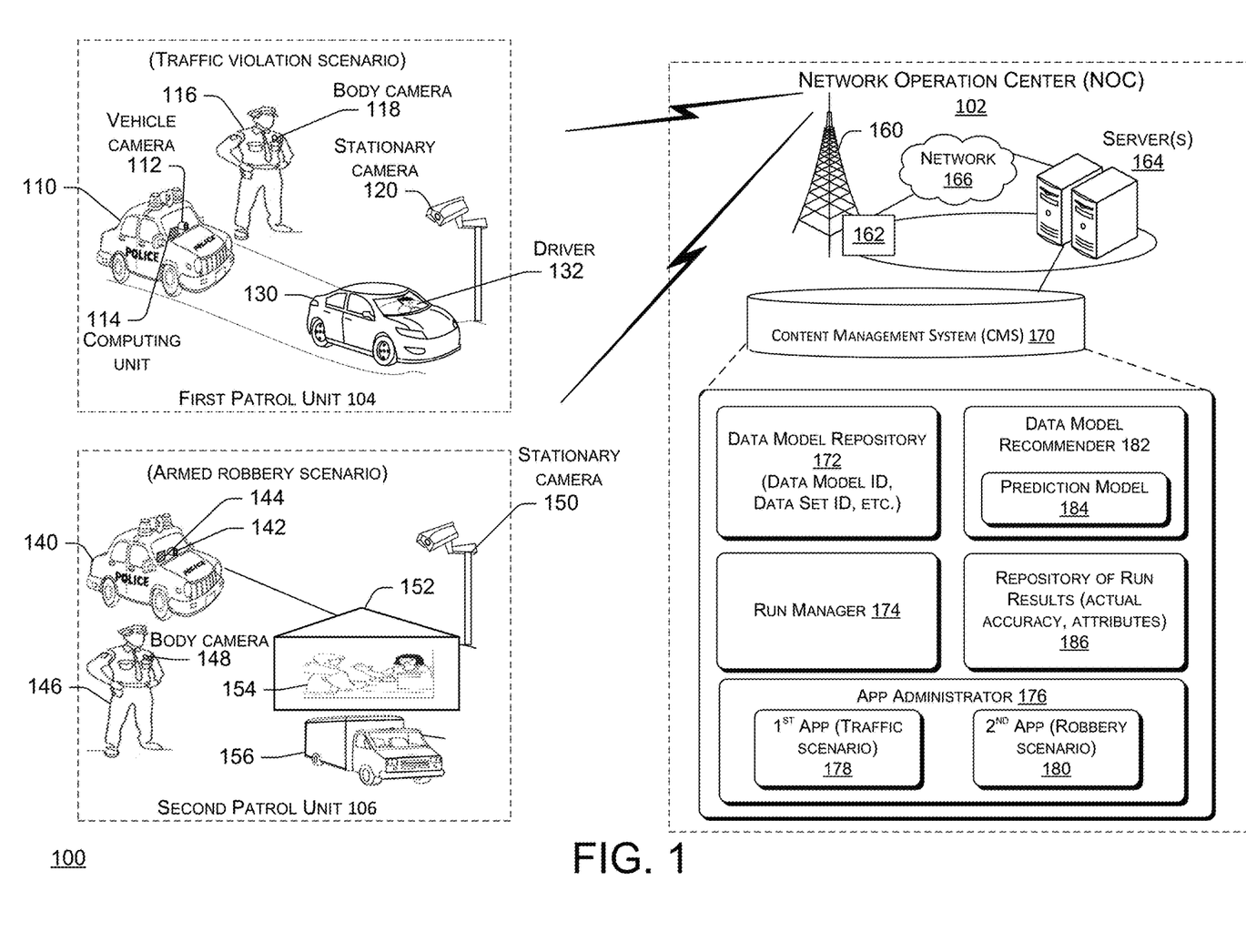
FIG. 1 illustrates an example architecture that facilitates an improvement of data models that can be used to generalize a new sample of data features during a law enforcement operation.

FIG. 1 illustrates a schematic view of an example base architecture 100 that facilitates an improvement of data models that can be used to generalize data features sample during a law enforcement operation. A data model may include a summary of a data set. The data set may include independent data features (e.g., gender, age, number of previous citations, gun owner) and dependent features that can generally include a desired end prediction (e.g., likelihood that an officer gets assaulted). In one example, a Content Management System (CMS) may store a set of data models for each application (or desired end prediction) such as plate number verification, facial verification, a determination of likelihood of assault to a law enforcement officer in a traffic violation or robbery scenario, car identification, and other types of desired end predictions. For the data model in the set of data models, the CMS may store data model identifications (IDs), data model historical versions including date/time stamps, data set IDs, data sets, expected (or calculated) accuracies of the data models, and detected actual accuracies. Further, the CMS may track and store improved versions of each data model in the set of data models for the application. In an example embodiment, a portion of the set of data models may be used as training data to create a prediction model that can select a data model with a substantively high confidence level from a new sample of data models, which generally includes the rest of the data models (test data) in the set of data models. In this embodiment, the use of the created prediction model may facilitate a speedier selection of the data model that can be improved, versioned, and/or stored for future improvements. Alternatively, the selected data model may be used for actual implementation during law enforcement operations. For example, the selected data model may be applied to a new sample of independent data features to generate a desired end prediction such as a likelihood that the officer may get assaulted.

The example base architecture 100 may include a Network Operations Center (NOC) 102, a first patrol unit 104, and a second patrol unit 106. Other units, although not shown in FIG. 1, may also be included. For example, during an operation, it is assumed that a significantly greater number of patrol units in different locations may be implemented. Furthermore, other types of units not identified in FIG. 1 may also be used without departing from the presently identified concepts.

In one example, the first patrol unit 104 is attending to a traffic violation scenario and collects audio, video, and other data that will be transmitted to the NOC 102. The first patrol unit 104 may utilize a law enforcement vehicle 110 with a vehicle camera 112, computing unit 114, a law enforcement officer (LEO) 116 audio description, body camera 118, and a stationary camera 120 to collect the data, for example, of a car 130 and/or a driver 132 who is a subject of the traffic violation scenario. In another location, the second patrol unit 106 is responding to an armed robbery scenario and collects audio, video, and other data that will similarly be transmitted to the NOC 102. In this other location, the second patrol unit 106 may utilize a vehicle camera 142, computing unit 144, body camera 148, and a stationary camera 150, to collect the data from a store 152, a robber 154, and/or a potential getaway vehicle 156. The vehicle camera 142 may be integrated with the computing unit 144 to form a single media recording device. In both cases, the NOC 102 may process the collected data and can send a corresponding output pattern (end prediction) to the first patrol unit 104 and the second patrol unit 106. The NOC 102, for example, may utilize an improved data model in the set of data models for a particular application to generate the output pattern.

In one example, the output pattern may include an end prediction such as a binary classification that indicates the presence or absence of a threat to the LEO 116/146, probability of the car 130 speeding away or not, a verification of a plate number (not shown) of the car 130, and the like. The NOC 102 may utilize a prediction model to select a data model that provides this type of end prediction and trains the selected data model on a new sample of collected data features to generate the output pattern. A creation of this prediction model is further described in FIG. 2 below.

Referring to the first patrol unit 104, the vehicle camera 112 may include an identification (ID) module (not shown) that identifies the vehicle camera 112 to the NOC 102. The vehicle camera 112 may capture audio and/or video and transmit the captured audio and/or video content to the NOC 102. Typically, the vehicle camera 112 is in communication with the vehicle computing unit 114 that provides a user interface to the LEO 116. The vehicle computing unit 114 can be a type of computer commonly referred to as a personal computer, or it may be a specialized computer designed to operate within specialized parameters of a law enforcement role. The vehicle computing unit 114 is a part of a computer-assisted dispatch system, similar to those commonly in use by law enforcement agencies, and typically includes an audio/video recording function or a digital video recorder (DVR).

The first patrol unit 104 also includes the LEO 116 and the portable body camera 118 that is capable of being worn on the person of the LEO 116 to record audio and/or visual data. The body camera 118 may include an input interface (not shown) such as physical buttons, a gesture recognition mechanism, a voice activation mechanism, and the like. Through such an input interface, the body camera 118 can be manually activated by a user (e.g., a law enforcement officer) to start or stop recording data, communicate with connected devices, etc. In one example, the body camera 118 may include an identification tag (not shown) that contains a digital value that identifies the body camera 118 to the NOC 102.

The stationary camera 120 is also shown to be located within the vicinity of the first patrol unit 104. The stationary camera 120 may include an ID module (not shown) that identifies the stationary camera 120 to the NOC 102. In one example, the stationary camera 120 may capture audio, video, or a combination thereof, in the vicinity of a particular location as shown. Although the stationary camera 120 is shown as mounted on a fixed pole, the stationary camera 120 may be mounted to any other fixed object, such as a building, or it may be mounted to a mobile object.

The second patrol unit 106 is similar to the first patrol unit 104 and includes a law enforcement vehicle 140 and the associated computing unit 144. The computing unit 144 may also include an ID module (not shown) that allows the computing unit 144 to be identified to the NOC 102. The second patrol unit 106 also includes the LEO 146 that uses the body camera 148, which is similar to the body camera 118 in the first patrol unit 104. The body camera 148 may include a digital value (not shown) stored in electronic memory to identify the body camera 148 to the NOC 102. It is noted that the body camera 148 may communicate directly with the computing unit 144 via any known wireless communication protocol, such as Bluetooth, BLE, WiFi (802.xx), cellular communication (e.g., 2G, 3G, 4G, 5G), etc.

The stationary camera 150 is also shown to be located within the vicinity of the second patrol unit 106. The stationary camera 150 may include an ID module (not shown) that identifies the stationary camera 150 to the NOC 102. In one example, the stationary camera 150 may capture audio, video, or a combination thereof, in the vicinity of a particular location as shown. Although the camera 150 is shown as mounted on a stationary pole, the stationary camera 150 may be mounted to any other fixed object, such as a building, or it may be mounted to a mobile object.

The NOC 102 is generally a communication, command, and control system of the base architecture 100. In the present context, NOC 102 may be part of a law enforcement agency or a facility that is operated by a third-party to offer services to the law enforcement agency. The NOC 102 may be used as a base from which to monitor operations, gather and disseminate intelligence information, and control devices under the control of law enforcement officers with which it is in communication. For example, the NOC 102 receives data from the first patrol unit 104, processes the data based upon the desired end prediction, and responds with end prediction results to the first patrol unit 104.

The NOC 102 includes a transmission tower 160 and a base station 162 that enable communications with the LEOs 116, 146, and other devices in the first patrol unit 104 and the second patrol unit 106. NOC 102 further includes one or more servers 164 that may receive or transmit data to the first patrol unit 104 and the second patrol unit 106 via a network 166. The network 166 may be a local area network (LAN), a wide-area network (WAN), a carrier or cellular network, or a collection of networks that includes the Internet. Network communication protocols (TCP/IP, 3G, 4g, etc.) may be used to implement portions of the network 166.

In an embodiment, the one or servers 164 may include a CMS 170 that can implement the improvements of the data models, which can be used for a particular application as described herein. The CMS 170 may include a data model repository 172, a run manager 174, an app administrator 176 with a first application 178 and a second application 180, a data model recommender 182 with a prediction model 184, and a repository of run results 186. Each component or module of the NOC 102 can be realized in hardware, software, or a combination thereof.

The CMS 170 may be configured to include multiple functionalities. One functionality includes surfacing a selected data model that can perform a desired end prediction. A prediction model may be utilized to select the data model that can perform the desired end prediction. Another functionality includes tracking versions of this data model and other data models, tracking expected accuracies and actual accuracies during actual runs, tracking run attributes, tracking data feature that facilitated improvements in the data model, and storing the tracked information as references for further improvements of the data models. Another functionality of the CMS includes providing to a software developer the underlying data set including a particular data feature or data features that improved the predictive capability of the data model. Another functionality of the CMS includes marking and surfacing of data sets that are defective due to defective data set sources (e.g., defective cameras or media recording devices), the erroneous transmission of telemetry data, erroneous calculations during data entries, and the like. In this functionality, the CMS stores the date and/or timestamp of the data set that includes the defective data set due to defective camera, erroneous transmission of the telemetry data (e.g., incomplete transmission of data streams), or erroneous calculations during data entries (e.g., algorithm error).

Another functionality of the CMS includes dynamically changing the prediction model based upon changes in desired end predictions or a detected change in condition that may require a different type of application. With all of these functionalities, the continuously updated data sets, metadata, and other attributes of the data model in the CMS 170 may be leveraged to overcome the deficiency of the data models to predict with 100% accuracy the desired end predictions that are especially critical in law enforcement operations.

The data model repository 172 may store the set of data models for each type of application. Each data model in the set of data models may include a summary of a corresponding data set. Further, each data model in the set of data models may include data model ID, version time stamps and date of versions, data set ID, and data sets that are stored in the data model repository 172. In one example, the data model repository 172 may store the data features that facilitated an improvement in the data model. As described herein the features that contributed to the improvement in the data model may be forwarded to the software developer for further reference when the same data model is selected by the prediction model as described herein, for example, a data model that may generate a desired end prediction includes 10 versions over a span of 10 years (one version per year). Given a situation where the prediction model may select this data model, then other information, such as the data feature in a particular version that may have contributed to the improvement of the selected data model, may be forwarded to the software developer as a reference. The data feature, for example, may include a particular type of data feature that was added as a root node and improved the confidence level of the selected data model.

Run manager 174 may be configured to facilitate the training of the data models to new samples of collected data features. Different applications may utilize a different set of data models. For example, a data model for verifying a plate number may be different from another data model for facial recognition. In this example, the run manager 174 may facilitate the training of the data model to a corresponding sample of data features to generate the desired end prediction (output pattern) that will be transmitted to the first patrol unit 104 and the second patrol unit 106.

The data model recommender 182 may be configured to select the data model from a set of data models to be used in generating the output pattern or to be processed for further improvements. In one example, the data model recommender 182 may use the prediction model 184 to select the data model from the set of data models that are configured for a particular application. For example, given a situation where the law enforcement officer is trying to verify whether it is safe to get into a high speed chase given a condition of environment and current weather, then the prediction model 184 may select the data model from the set of data models that may provide the desired output pattern of identifying level of danger in going into a high speed chase. In this case, each data model in the set of data models may provide a similar type of end prediction that includes determination of level of danger in going into a high speed chase. Further, each data model in the set of data models may utilize a distinct algorithm (e.g., decision trees, linear regression, logistic regression, support vector machines), a particular number of data features as variables, or a combination of both. In another example, the prediction model 184 may be used to select the data model from another set of data models to determine a likelihood that a suspect will react violently against LEO 116. In this other example, the set of data models may provide a similar type of prediction that includes the determination of the likelihood that the suspect will react violently against LEO 116, and so on.

In one example, the prediction model 184 may include the algorithm that selects the data model from the set of data models based upon the data model that is associated with a substantively high confidence level. Alternatively, or additionally, the selection of the data model from the sets of data models may be based upon criteria for a desired end prediction. The criteria may include type of input data features (e.g., gender, age) and number of input data features. Different applications with different desired end predictions may utilize a different prediction model 184. For example, the prediction model 184 to select the data model that may generate a plate number verification may be different from the prediction model 184 that selects the data model to determine a likelihood of assault on a law enforcement officer. In both cases, the prediction model 184 may select the data model that is associated with substantively high confidence level.

The repository of run results 186 may store the actual accuracies, attributes, historical data, and information about the data model when it is trained to a new sample of data features. In one example, the repository of run results 186 may store run ID for each training, run attributes or labels, and the actual accuracy. The data model recommender 182 may track the actual accuracies in the repository run results 186 and the tracked accuracies may be used as a reference to recommend improvement in the data model.

The app administrator 176 may facilitate the creation and storing of different applications that may be used in different law enforcement scenarios. For example, the app administrator 176 may store the first app 178 for a traffic violation scenario while the second app 180 may be used for an armed robbery scenario. During the creation of the application, the software developer may initially search for a data model that matches the criteria of the application to be created. In this case, the data model recommender 182 may use the prediction model 184 to select the data model from a set of data models in the data model repository 172. Each data model in this set of data models may generate an output pattern that matches the desired output pattern of the application to be created. With the selected data model, the software developer may then incorporate underlying data of the selected data model and at least one other historical version of the selected data model to create an incorporated data set that can be used as a reference to generate a new data model. In one example, the at least one other historical version includes the version that is associated with the data feature that contributed to an improvement of another data model version in the set of data models. The new data model may be stored as another version of the selected data model. Alternatively, the new data model may be used to classify a new sample of data features to generate the desired end prediction.

Example Creation of a Prediction Model

Figure 2:
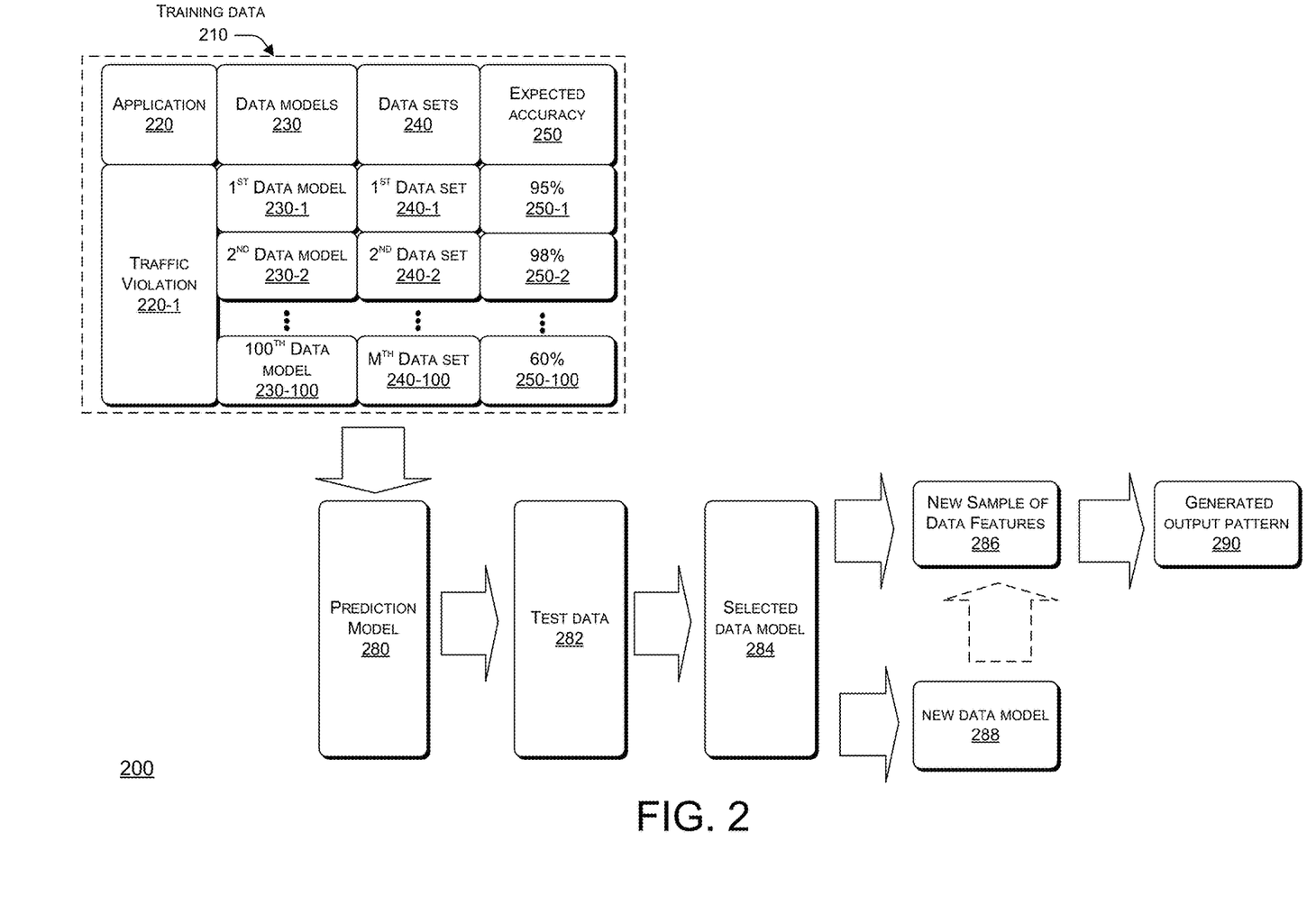
FIG. 2 is a block diagram of creating a prediction model from a training data, and training the created prediction model to a test data to select the data model that may be used to generalize the new sample of data features.

FIG. 2 is a block diagram 200 showing an example implementation of creating a particular prediction model from a training data, and training (or running) the created prediction model to a test data to select the data model from (test) data models. The selected data model may be used to generalize new samples of collected data features to generate an output pattern, or the selected data model can be further manipulated to create a new data model with improved predictive capabilities. The new data model may be used as well to generalize the new samples to generate the output pattern. Block diagram 200 includes a training data 210, a prediction model 280, test data 282, a selected data model 284, a new sample of data features 286, a generated output pattern 288, and a created new data model 290. In one example, the training data 210 may be used to generate the prediction model 280 that is used to select the data model from a set of test data models (test data 282) that can be associated with a substantively high confidence level. The set of test data models 282 may include the data models other than the data models in the training data 210. The training data 210 may include type of application 220, data models 230, data sets 240, and data model expected accuracy 250.

In an implementation, the prediction model 280 for the traffic violation application 220-1 may include a multi-output classification algorithm that selects the data model 284 (as the multi-output classification) when trained to the test data 282. The selection of the data model 284 may be based upon its associated confidence level and/or based upon criteria (e.g., types and a number of data features) of the application. In this implementation, the selected data model 284 may be applied to the new sample of data features 286 to generate the output pattern 288. The output pattern 288 may include binary classification, multiclass classification, or any other type of dependent label. For example, the output pattern 288 includes the likelihood of assault on the law enforcement officer.

Referring to the training data 210, each one of the data models 230 may correspond to a data set 240, and includes the corresponding expected accuracy 250. For example, the $1^{st}$ data model 230-1 that represents a summary of the first data set 240-1 may include an expected accuracy of 95%, the $2^{nd}$ data model 230-2 that represents a summary of the second data set 240-2 may include an expected accuracy of 98%, and so on. In this example, the training data 210 may be used to create the prediction model 280 that can select the data model from the test data 282 to be processed for further improvements. Alternatively, or additionally, the training data 210 may be used to create the prediction model 280 that can select the data model from the test data 282 to generalize the new sample of data features 286. In an embodiment, the data models 230 that may be used for the training data 210 may include one or more versions of the data model. For example, the Pt data model 230-1 may actually include a second version, a third version, or a last version of the same $1^{st}$ data model 230-1. In another example, the $2^{nd}$ data model 230-2 may actually include a second version, a third version, or a last version of the same $2^{nd}$ data model 230-2, and so on. In these examples, the created prediction model 280 may select the data model that can be associated with a high confidence level in its end prediction.

Given a situation where the selected data model 284 may be manipulated for further improvements, the CMS may further send the previous data features that contributed to the improvements of other data models or in previous versions of the same selected data model 284. For example, the data features that may be associated with a historical version of selected data model 284 may contribute to the improvement of the data model in a particular set of data models. Further, the CMS may identify the data sets that include inaccurate parameters due to identified defective cameras that obtained the telemetry data. For example, the $1^{st}$ data set 240-1 used a defective camera on a certain date or timestamp. In this example, the CMS may send an alert to the software developer not to use the $1^{st}$ data set 240-1 at the certain date or timestamp. The defective camera may be identified through another sensor, for example, that may be dedicated to test the deployed cameras as described herein.

In one example, the created new data model 290 may be trained to the new sample of data features 286 to generate the output pattern 288. In this regard, the selected data model 284 may be initially processed to generate the new data model 290, and the new data model 290 can then be applied to generalize the new feature sample.

Example Network Server Environment

Figure 3:
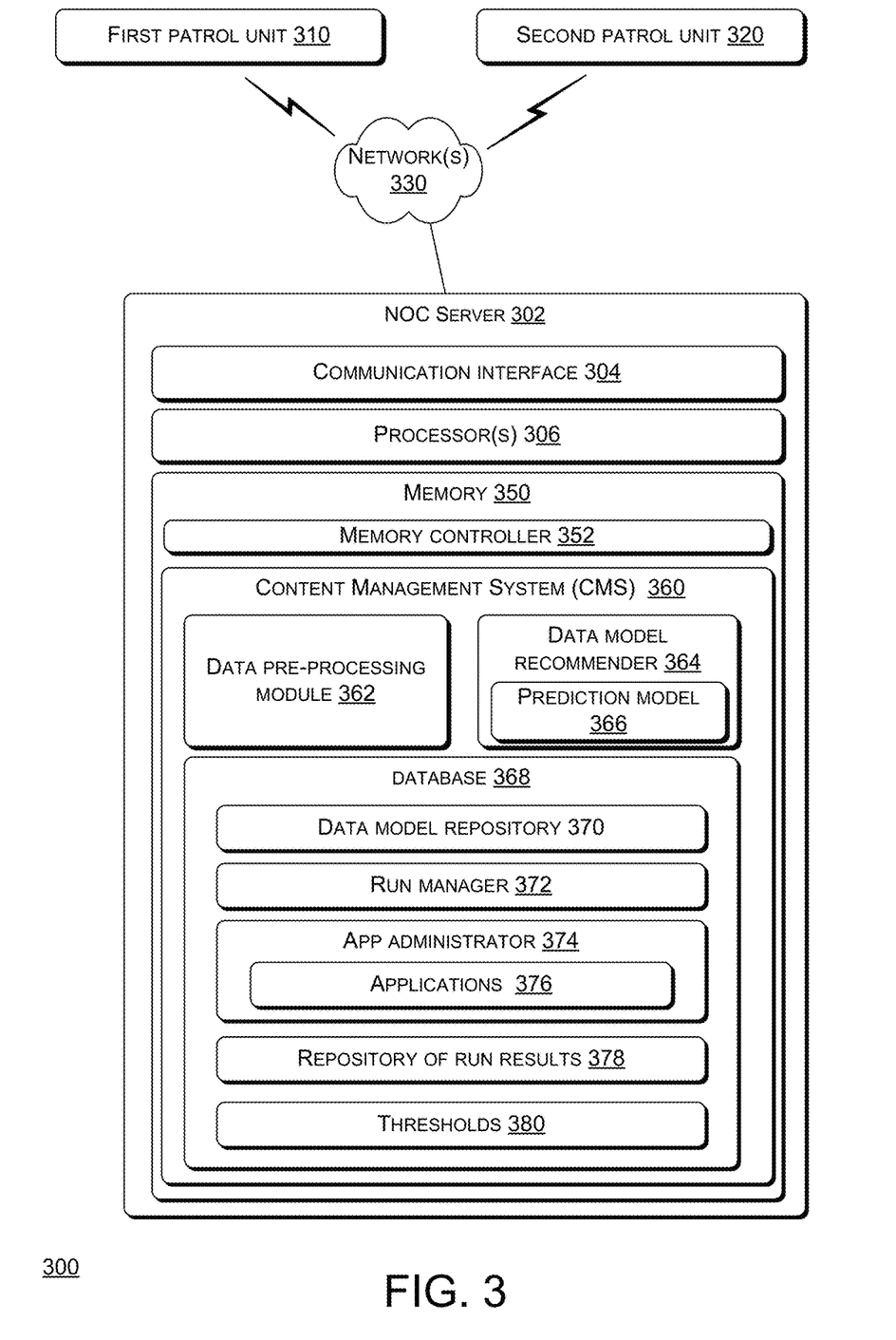
FIG. 3 is a diagram of an example network server environment in accordance with the described technologies.

FIG. 3 is a diagram of an example network server environment 300 in accordance with the technologies described herein. The network server environment 300 includes a server such as a NOC server 302 that supports law enforcement operations/services by sending output pattern such as threat-level classification to deployed first patrol unit 310 and a second patrol unit 320. The NOC server 302 receives and processes data from the deployed patrol units and sends back the output patterns such as substantive real-time threat level assessment of a particular situation where the LEO is currently attending to a traffic violation scenario, armed robbery, and the like. In one example, the NOC server 302 includes an artificial intelligent (AI) model implementation that selects a data model from a plurality of data models and utilizes the selected data model to generate the output patterns. Alternatively, the selected data model is processed to create a new data model with improved predictive capability and confidence level.

The NOC server 302 includes a computer system that processes data from the deployed patrol unit and sends a real-time scenario assessment response in return. The real-time scenario assessment may include an analysis of data in the context of law enforcement operations. For example, the analysis provides a threat-level classification to the LEO in the field of operations. In another example, the analysis provides verification or non-verification of a plate number, and so on.

The NOC server 302 includes a communications interface 304 that facilitates communication with cameras in the deployed patrol units, stationary cameras, body cameras worn by the LEOs, servers, other law enforcement agencies, etc. located outside of the NOC server 302, and provides networking capabilities for the NOC server 302. For example, the NOC server 302, by way of the communications interface 304, may exchange data with other electronic devices such as the computing unit 114, vehicle camera 112, body camera 118, LEO's radio, other laptops, computers, servers, etc. via the one or more networks 330. Communication between the NOC server 302 and other electronic devices may utilize any sort of communication protocol known in the art for sending and receiving data and/or voice communications.

The NOC server 302 includes a processor 306 having electronic circuitry that executes instruction code segments by performing basic arithmetic, logical, control, memory, and input/output (I/O) operations specified by the instruction code. The processor 306 can be a product that is commercially available through companies such as Intel® or AMD®, or it can be one that is customized to work with and control a particular system. The processor 306 may be coupled to other hardware components used to carry out device operations. The other hardware components may include one or more user interface hardware components not shown individually—such as a keyboard, a mouse, a display, a microphone, a camera, and/or the like—that support user interaction with the NOC server 302.

The NOC server 302 also includes memory 350 that stores data, executable instructions, modules, components, data structures, etc. The memory 350 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

A memory controller 352 is stored in the memory 350 of the NOC server 302. The memory controller 352 may include hardware, software, or a combination thereof, that enables the memory 350 to interact with the communication interface 304, processor 306, and other components of the NOC server 302. For example, the memory controller 352 receives data (e.g., audio and video contents) from the communication interface 304 and sends the received data to a CMS 360 for further processing. In another example, the memory controller 352 may retrieve data from memory 350 where the data will be processed in the processor 306. Still, in another example, the memory controller 352 in communication with the processor 306 and the communication interface 304 may facilitate the sending of the output patterns to the deployed patrol units, and so on. The CMS 360 is similar to the CMS 170 as described above in FIG. 1.

The memory 350 stores the CMS 360 that, when executed, performs a selection of the data model from a set of data models for a particular application and training of the selected data model on the new sample of data features to generate the output pattern or end prediction. Alternatively, the selected data model may be used as a reference to create a new data model with improved predictive capability and confidence level. The new data model may be stored as another version of the selected data model.

As shown, the CMS 360 includes a data pre-processing module 362, a data model recommender 364 with a prediction model 366, and a database 368 including a data model repository 370, run manager 372, app administrator 374, applications 376, repository of run results 378, and thresholds 380. Although shown as part of the CMS 360, the data model repository 370, run manager 372, app administrator 374, applications 376, repository of run results 378, and thresholds 380 may be stored in other memory (not shown), in another content sharing services server, or in remote locations. Further, each component of the CMS 360 can be realized in hardware, software, or a combination thereof.

The data pre-processing module 362 may be configured to receive and process received telemetry data from different devices in the first patrol unit 310 and/or second patrol unit 320. In one example, the data pre-processing module 362 may extract features from the received telemetry data and further removes duplicate labels, erroneous/null values, and outlier values. In one example, the data pre-processing module 362 may use different thresholds for different scenarios when extracting features. For example, the data pre-processing module 362 may use a high sound threshold when the patrol unit is patrolling a concert zone and a low sound threshold when the patrol unit is patrolling a quiet neighborhood with minimal recorded criminality rates. In this example, the database may not be flooded with unnecessary data.

The data model recommender 364 may be configured to select the data model from the data model repository 370 to be used in generating the output pattern or to be processed for further improvements. The data model recommender 364 may use the prediction model 366 that includes a multiclass classifier algorithm that can be trained on a set of test data models to select the data model from the set of test data models. The set of test data models may include the data models other than the data models that were used as training data to create the prediction model 366. The selected data model may then be trained on the collected data to generate the output returns that are fed back to the first patrol unit 310 and/or second patrol unit 320. The attributes from the training of the selected data model over the collected data are stored in the repository of run results 378. These attributes may include run ID, actual accuracy, and labels.

The run manager 372 may be configured to train the selected data model to a new sample of data features. Different data models may be trained on different types of data features to be generalized or classified. For example, the data model for verifying a plate number may require a different set of data feature samples from the data model for verifying facial expressions. In this example, the run manager 372 may facilitate the training of the data model on the collected data to generate the output pattern that will be transmitted to the first patrol unit 310 and the second patrol unit 320.

The app administrator 374 may facilitate the creation and storing of different applications that may be used in different law enforcement scenarios. For example, the app administrator 374 may store an application for a traffic violation scenario while a second app may be used for an armed robbery scenario. Depending upon the desired end prediction, different applications may be used to generate the desired end prediction.

The repository of run results 378 may store the actual accuracies, attributes, historical data, and information about the data model when it is trained to a new sample of data features such as the collected data from the deployed patrol units. In one example, the repository of run results 378 may store run ID for each training, run attributes or labels, and the actual accuracy.

The thresholds 380 may include preconfigured values that can be used to determine the amount of improvements on the created new data models. In one example, a software developer may incorporate the underlying data set of the selected data model and at least one other historical version of the selected data model to create the new data model. The underlying data set of the selected data model and historical version of the selected data model may include the data features at different dates or time stamps. These data features may be incorporated to generate an incorporated data set that may be represented by the new data model. In this case, the thresholds 380 may be used to determine the amount of improvements in the new data model. For example, threshold 380 is used as a reference to surface the new data model that generated an improvement of at least 10% as compared to the selected data model. In this example, the new data model may be stored to update the data models in the data model repository 370.

Further functionalities of the NOC server 302 and its component features are described in greater detail, below.

Example Implementation—Data Model Improvement Implementation

Figure 4:
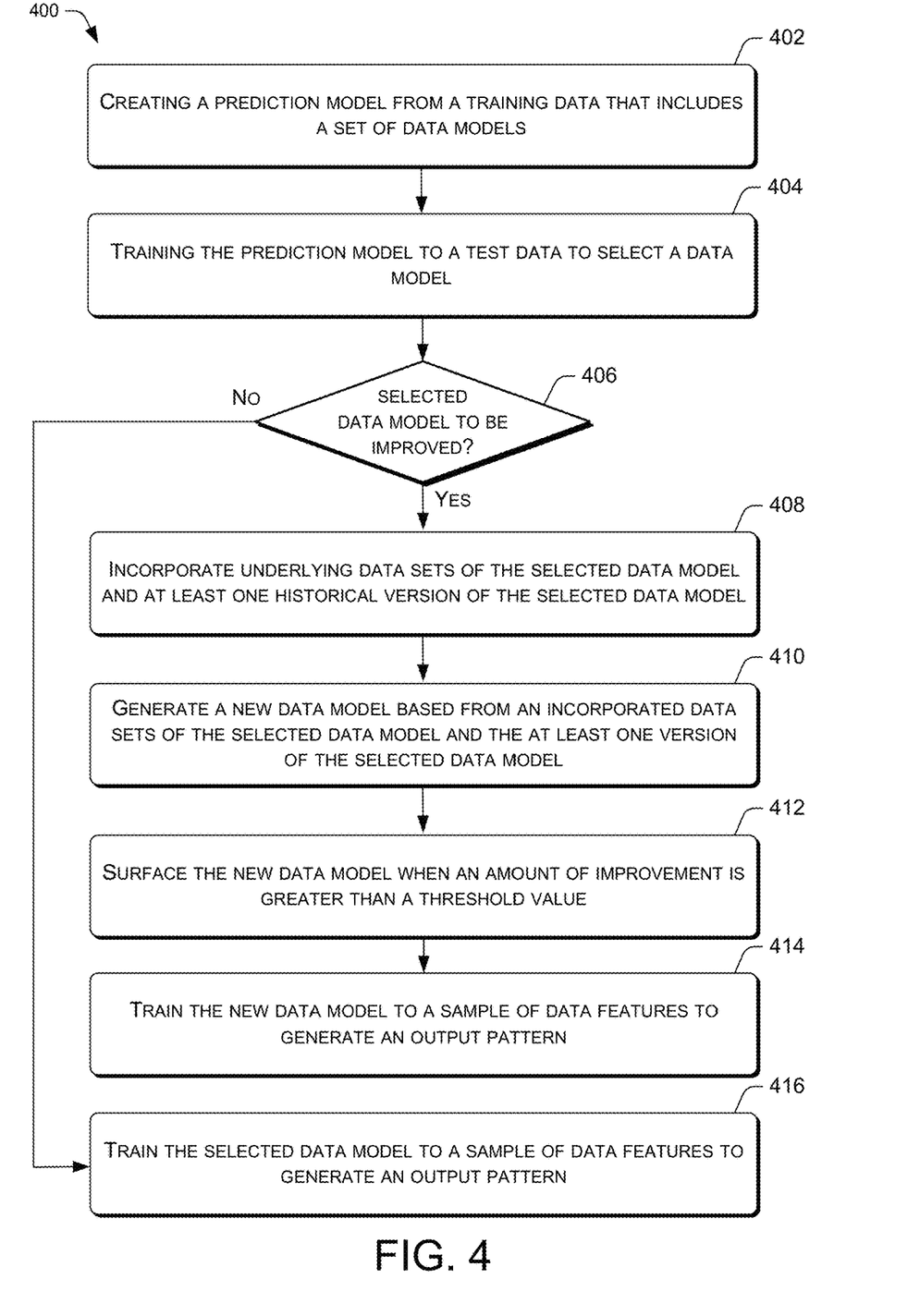
FIG. 4 is a flow diagram of an example methodological implementation for selecting a data model that can be used to generalize the new sample of data features during a law enforcement operation.

FIG. 4 is a flow diagram 400 that depicts a methodological implementation of at least one aspect of the techniques for selecting the data model that can be used to generate an output pattern as described herein. In the following discussion of FIG. 4, continuing reference is made to the elements and reference numerals shown in and described with respect to the training data 210 of FIG. 2, and the NOC server 302 of FIG. 3. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 402, the data model recommender 364 creates the prediction model 280 from a training data 210. In one example, a set of data models for a particular application may be divided into a training data and a test data. In some cases, each data model in the training data may include the version of that data model with high confidence level or expected accuracies. In other cases, the data models in the training data include a random selection of versions with different kinds of confidence levels. In an example embodiment, the training data may be used to create the prediction model 280 that can select the data model that is associated with a substantively high confidence level. The data model may be selected from the test data that includes the data models that were not included in the training data.

At block 404, the processor 306 in communication with the data model recommender 364 trains the created prediction model 280 to a test data to select the data model from the test data. In one example, the test data may include the data models that were not used as training data. The data models that were not included in the training data may include new sample of data models.

At decision block 406, processor 306 determines whether the data model is selected for purposes of data model improvement or to be used by the particular application to generate an output pattern. In a case where the data model is selected for further improvements ("Yes" at block 406), then at block 408, the processor 306 incorporates the underlying data sets of the selected data model and the underlying data sets of at least one historical version of the selected data model. In some cases, the underlying data set of the historical version includes the data features that are associated with a particular data model version that provided improvements to another version of the same data model.

At block 410, processor 306 generates a new data model based on the incorporated data sets between the selected data model and the at least one version of the selected data model. In one example, the incorporated underlying data sets may provide a new data set that can be represented by the new data model.

At block 412, processor 306 surfaces the new data model when an amount of improvement is greater than a threshold value. In one example, the expected accuracy of the new data model may be compared with a threshold value (e.g., at least 10% improvement from the selected data model). When the improvement, for example, is at least equal to a threshold value of 10%, then the processor 306 may surface the new data model to be used by the app administrator 374. In one example, at block 414, the new data model may be trained on a new sample of data features to generate an output pattern.

Returning to decision block 406, in a case where the data model is selected to generate the output pattern ("No" at block 406), then at block 416, the processor 306 may use the selected data model to generate the output pattern. The output pattern may include the classification such as the likelihood that the LEO may face a violent reaction from the suspect.

Example Implementation—Using Change in Condition to Change Prediction Model

Figure 5:
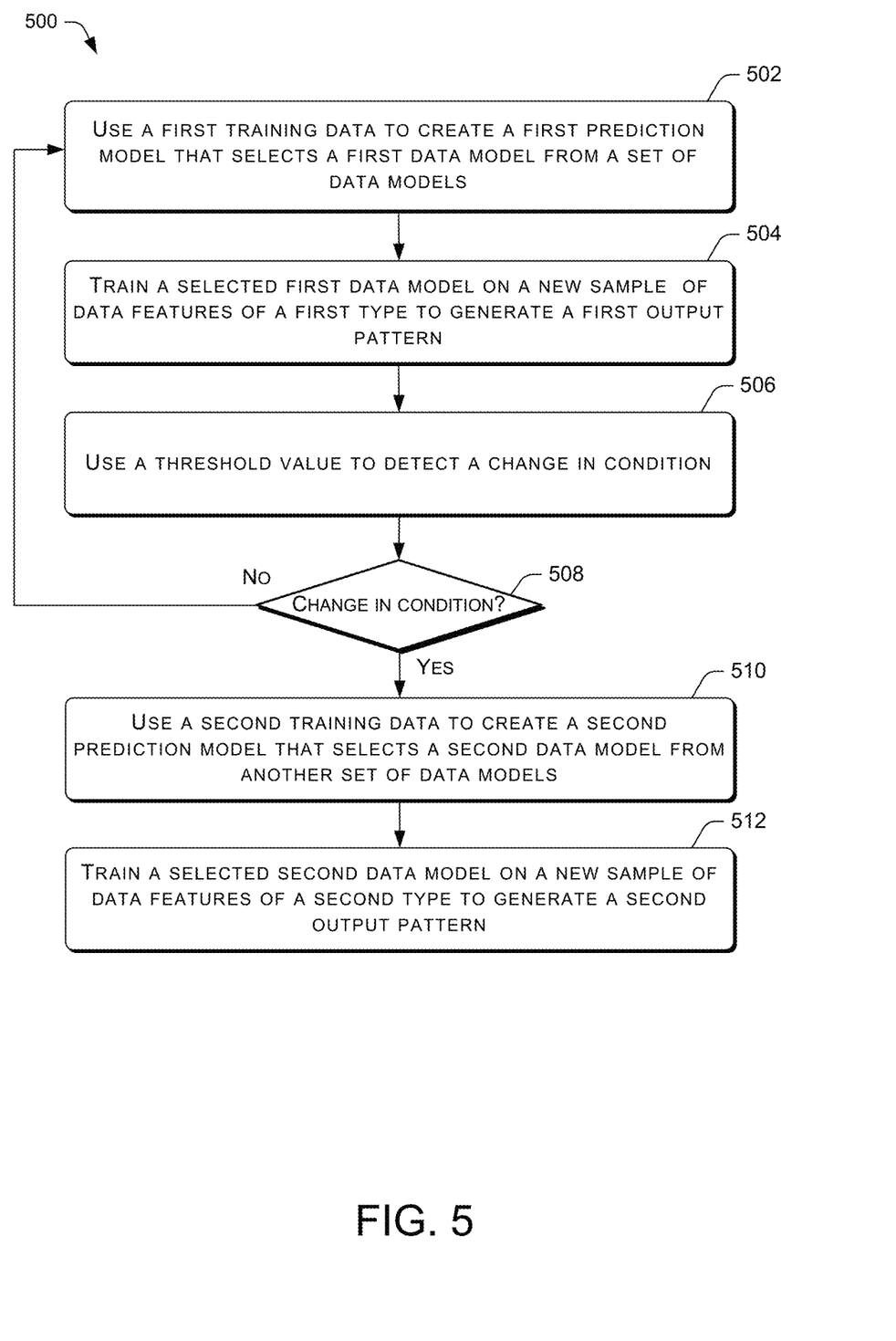
FIG. 5 is a flow diagram of an example methodological implementation for changing the prediction model based upon a change in condition.

FIG. 5 is a flow diagram 500 that depicts a methodological implementation of at least one aspect of the techniques for changing the prediction model based upon a change in condition. In one example, the change in condition may include a change in scenarios, desired output patterns, and the like. In the following discussion of FIG. 5, continuing reference is made to the elements and reference numerals shown in and described with respect to the training data 210 of FIG. 2, and the NOC server 302 of FIG. 3. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 502, the data model recommender 364 uses a first training data to create a first prediction model that selects a first data model from a set of data models. For example, the data model recommender 364 uses the training data 210 of FIG. 2 to create the prediction model 280 for the traffic violation 220-1 application. In this example, the data model recommender 364 uses the first prediction model to select the first data model from the set of data models.

At block 504, processor 306 trains the selected data model on a new sample of data features of a first type to generate a first output pattern. In one example, different applications may use different corresponding prediction models. Accordingly, different prediction models may select different data models that may be trained to different types of data features.

At block 506, the data model recommender 364 uses a threshold to detect a change in condition. In one example, the change in condition includes a change in scenarios such as from traffic violation scenario to armed robbery scenario or neighborhood patrol, change in desired output patterns such as from license plate identification to facial identification, and the like. In this example, the data model recommender 364 may utilize a preconfigured threshold from the thresholds 380 in detecting a change in condition. For example, the preconfigured threshold uses a sound threshold of 120 dB for detecting gunfire. Given a situation where gunfire is detected during a traffic violation scenario based on the collected audio data ("Yes" at block 508), then the data model recommender 364 may shift to another training data due to the change in condition. Alternatively, or additionally, the change in condition may be based upon a selection of a different output pattern.

At decision block 508, the processor 306 in communication with the data model recommender 364 determines whether there is a change in detected condition. When the condition is detected ("Yes" at block 508), then at block 510, the data model recommender 364 may use a second training data from a different set of data models to create a second prediction model that selects a second data model from test data of the different set of data models. For example, after the traffic violation scenario ceases to exist and the patrol unit is back to patrolling the neighborhood (application), the set of data models that may be utilized for patrolling the neighborhood (application) may be used to generate the second training data.

At block 512, the data model recommender 364 may train the selected second data model to a new sample of data features of a second type to generate a second output pattern. In the preceding example where the traffic violation scenario ceases to exist and the patrol unit returns to patrolling the neighborhood, the selected second data model that corresponds for the patrolling of the neighborhood may be trained to a different type of new sample of data features. For example, the end prediction for the traffic violation scenario includes plate number verification while the end prediction for the neighborhood patrol may include detection of noise. In this example, the selected data model for the neighborhood patrol may be trained to a different type of data features such as sound level, neighborhood type, and hour of the day.

Referring back to decision block 508, when there is no change in condition detected ("No" at block 506), the process goes back to block 502.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media storing computer-executable instructions that upon execution cause one or more computers to perform acts comprising:
    operating, by a content management system (CMS), a prediction model stored in the CMS to select a data model from a plurality of stored data models in the CMS for a law enforcement application;
    retrieving a first set of data features used to train the selected data model and a second set of data features used to train at least one historical version of the selected data model;
    incorporating the first set of data features and the second set of data features to generate an incorporated data set;
    generating a new data model based upon the incorporated data set, the new data model being configured to generate an output pattern;
    comparing an expected accuracy of the new data model with an associated expected accuracy of the selected data model; and
    operating the new data model for the law enforcement application by the CMS when the expected accuracy of the new data model is greater than the associated expected accuracy of the selected data model by at least a threshold value, wherein the operating the new data model comprises:
        processing, by the new data model, real-time data received from the law enforcement application; and
        sending the output pattern generated by the new data model as a real-time notification.

2. The one or more non-transitory computer-readable storage media of claim 1, wherein the selected data model includes an output pattern that is based from an output pattern of the law enforcement application.

3. The one or more non-transitory computer-readable storage media of claim 1, wherein a version of the retrieved first set of data features for the selected data model is different from a version of the retrieved second set of data features.

4. The one or more non-transitory computer-readable storage media of claim 1, wherein the new data model is stored as another version of the selected data model.

5. The one or more non-transitory computer-readable storage media of claim 1 further comprising: tracking, by the CMS, of defective data set sources; and marking data models that are associated with the defective data set sources.

6. The one or more non-transitory computer-readable storage media of claim 5, wherein the defective data set sources include telemetry data that are collected from defective devices.

7. The one or more non-transitory computer-readable storage media of claim 1, wherein the CMS is configured to access different prediction models that are used for different applications.

8. The one or more non-transitory computer-readable storage media of claim 1, wherein the historical version of the selected data model is associated with data features that contributed to an improvement of another data model in the plurality of stored data models.

9. A computer system, comprising:
    at least one processor;
    a memory coupled to the at least one processor, the memory storing instructions that, when executed by the at least one processor, cause the at least one processor to perform operations comprising:
        operating a prediction model stored in a content management system (CMS) to select a data model from a plurality of stored data models in the CMS for a law enforcement application;
        retrieving a first set of data features used to train the selected data model and a second set of data features used to train at least one historical version of the selected data model;
        incorporating the first set of data features and the second set of data features to generate an incorporated data set;
        generating a new data model based upon the incorporated data set, the new data model being configured to generate an output pattern;
        comparing an expected accuracy of the new data model with an associated expected accuracy of the selected data model; and
        operating the new data model for the law enforcement application by the CMS when the expected accuracy of the new data model is greater than the associated expected accuracy of the selected data model by at least a threshold value, wherein the operating the new data model comprises:
            processing, by the new data model, real-time data received from the law enforcement application; and
            sending the output pattern generated by the new data model as a real-time notification.

10. The computer system of claim 9, wherein the selected data model includes an output pattern that is based from an output pattern of the law enforcement application.

11. The computer system of claim 9, wherein a version of the retrieved first set of data features for the selected data model is different from a version of the retrieved second set of data features.

12. The computer system of claim 9, wherein the new data model is stored as another version of the selected data model.

13. The computer system of claim 9, wherein the computer system is configured to track defective data set sources and mark data models that are associated with the defective data set sources.

14. The computer system of claim 13, wherein the defective data set sources include telemetry data that are gathered from defective devices.

15. The computer system of claim 9, wherein the computer system is configured to access different prediction models that are used for different applications.

16. A computer-implemented method, comprising:
operating, by a content management system (CMS), a prediction model stored in the CMS to select a data model from a plurality of stored data models in the CMS for a law enforcement application;
retrieving a first set of data features used to train the selected data model and a second set of data features used to train an original version of the selected data model;
incorporating the first set of data features and the second set of data features to generate an incorporated data set;
generating a new data model based upon the incorporated data set, the new data model being configured to generate an output pattern;
comparing an expected accuracy of the new data model with an associated expected accuracy of the selected data model; and
operating the new data model for the law enforcement application by the CMS when the expected accuracy of the new data model is greater than the associated expected accuracy of the selected data model by at least a threshold value, wherein the operating the new data model comprises:
processing, by the new data model, real-time data received from the law enforcement application; and
sending the output pattern generated by the new data model as a real-time notification.

17. The computer-implemented method of claim 16, wherein the CMS is configured to access different prediction models that are used for different applications.

* * * * *